US007448424B2

(12) United States Patent
Wu

(10) Patent No.: US 7,448,424 B2
(45) Date of Patent: Nov. 11, 2008

(54) BONDING MECHANISM OF CORRUGATED PAPER MAKING MACHINE

(76) Inventor: Kuan-Shiung Wu, 6F., No. 102, Sec. 2, Meishih Rd., Yangmei Township, Taoyuan County 326 (TW)

( * ) Notice: Subject to any disclaimer, the term of this patent is extended or adjusted under 35 U.S.C. 154(b) by 413 days.

(21) Appl. No.: 11/305,179

(22) Filed: Dec. 19, 2005

(65) Prior Publication Data

US 2007/0102122 A1 May 10, 2007

(30) Foreign Application Priority Data

Nov. 10, 2005 (TW) .............................. 94219426 U

(51) Int. Cl.
*B32B 37/00* (2006.01)

(52) U.S. Cl. ....................... 156/470; 156/555; 156/578; 156/583.5

(58) Field of Classification Search ................. 156/359, 156/555, 580, 582, 583.1, 583.5, 358, 470, 156/494, 578
See application file for complete search history.

(56) References Cited

U.S. PATENT DOCUMENTS 4,746,391 A * 5/1988 Heyse et al. ................ 156/359
6,149,751 A * 11/2000 Marschke ................... 156/205

* cited by examiner

*Primary Examiner*—James Sells
(74) *Attorney, Agent, or Firm*—Leong C. Lei

(57) ABSTRACT

A bonding mechanism of corrugated paper making machine includes an endless loop-like band and an adjusting mechanism for adjusting position and configuration of the band with respect to a surface sheet of the corrugated paper pasted on a core sheet. The adjustment performed by the adjusting mechanism changes an area of surface contact between the band and the surface sheet of the corrugated paper and thus changing a pressurizing area between the surface sheet and the core sheet. The surface contact between the band and the surface sheet enhances bonding operation of the surface sheet to the core sheet and increases the time when a pressure is applied in the pressurizing area to bond the surface sheet and the core sheet together. The surface contact eliminates the potential damage to the surface sheet caused by application of concentrated force at a single contact point on the surface sheet and increases the manufacturing efficiency of the corrugated paper.

2 Claims, 5 Drawing Sheets

BONDING MECHANISM OF CORRUGATED PAPER MAKING MACHINE

BACKGROUND OF THE INVENTION (a) Technical Field of the Invention

The present invention relates generally to a paste-bonding mechanism of a corrugated paper making machine, and in particular to a corrugated paper bonding mechanism featuring increased pressurizing area between a core sheet and a surface sheet to enhance bonding strength between the core sheet and the surface sheet.

(b) Description of the Prior Art

FIG. 1 of the attached drawings shows a conventional corrugated paper bonding device, which comprises a primary corrugated roller 10 and a secondary corrugated roller 20 between which a core sheet that is originally a flat-surfaced paper sheet 5*a* is fed to form corrugation on the paper sheet, which then serves as the corrugated core sheet 5*a*. A paste application roller 30 applies a layer of paste on a surface of the corrugated core sheet 5*a* and thereafter, another paper sheet, which serves as a surface sheet 5*b*, is laid on and bonded to the paste layer of the core sheet 5*a* to form the finished corrugated paper 5*c*. Bonding of the surface sheet 5*b* to the core sheet 5*a* is done by feeding the core sheet 5*a* with the surface sheet 5*b* laid thereon between a pressurizing roller 40 and the primary corrugated roller 10 to induce a pressure between the surface sheet 5*b* and the core sheet 5*a*.

The conventional manner of pressurizing the surface sheet 5*b* against the core sheet 5*a* suffers limited pressurizing area between the core sheet 5*a* and the surface sheet 5*b*, and very limited time of application of the pressure. This often causes poor bonding strength of the corrugated paper. A conventional solution for such a drawback is to apply a great pressure between the core sheet and the surface sheet, but, as illustrated in FIG. 2, this often causes damage to the surface sheet, such as fracture of fibrous structure of the surface sheet and shows up indentation marks on the surface sheet, eventually reducing fracture strength of the corrugated paper.

Thus, the present invention is aimed to overcome the drawbacks of the conventional devices by providing a bonding mechanism of corrugated paper making machine that improves product quality and increases operation efficiency.

SUMMARY OF THE INVENTION

The primary purpose of the present invention is to provide a bonding mechanism of a corrugated paper making machine, wherein a pressurizing area induced by a surface contact is adjustably formed between a surface sheet and a core sheet of the corrugated paper to enhance bonding strength between the sheets and increasing the pressurizing area and pressurizing time period between the sheet and eliminating potential risk of damage to the surface sheet of the corrugated paper.

Another object of the present invention is to provide a corrugated paper bonding mechanism comprising an endless loop-like band to form an adjustable surface contact with the corrugated paper and an adjusting mechanism to adjust the position and the configuration of the band with respect to the surface sheet.

A further object of the present invention is to provide a corrugated paper bonding mechanism wherein the adjusting mechanism comprises a swing arm.

A further object of the present invention is to provide a corrugated paper bonding mechanism wherein the adjusting mechanism comprises an elevating member.

A further object of the present invention is to provide a corrugated paper bonding mechanism wherein the adjusting mechanism comprises an extendible member for adjusting tension of the band.

A further object of the present invention is to provide a corrugated paper bonding mechanism wherein the adjusting mechanism comprises a plurality of rollers supporting the rotation of the band.

Yet a further object of the present invention is to provide a corrugated paper bonding mechanism further comprising a heating roller to accelerate the curing of a paste applied between the surface sheet and the core sheet.

To achieve the above objects, the present invention provides a corrugated paper bonding mechanism comprising an endless band and an adjusting mechanism for changing position and configuration of the band with respect to corrugated paper to change a pressurizing area in which a pressure is applied between a surface sheet and a core sheet of the corrugated paper.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
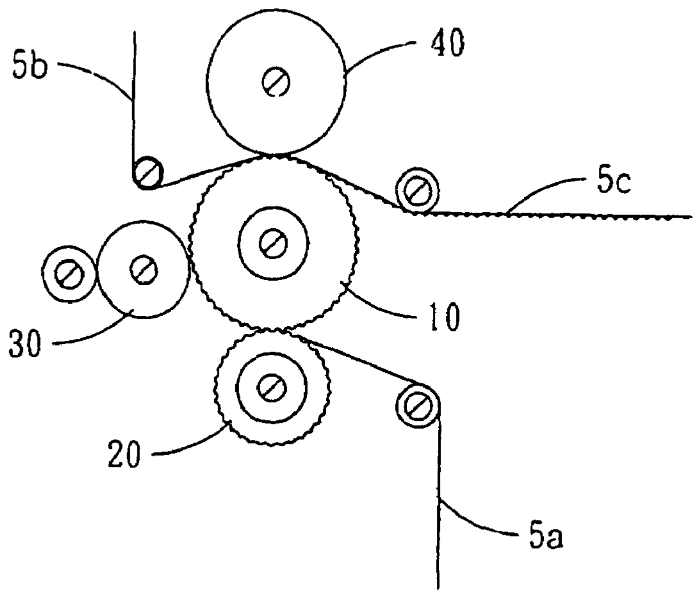
FIG. 1 PRIOR ART
FIG. 1 is a schematic view showing a conventional corrugated paper bonding device.
Figure 2:
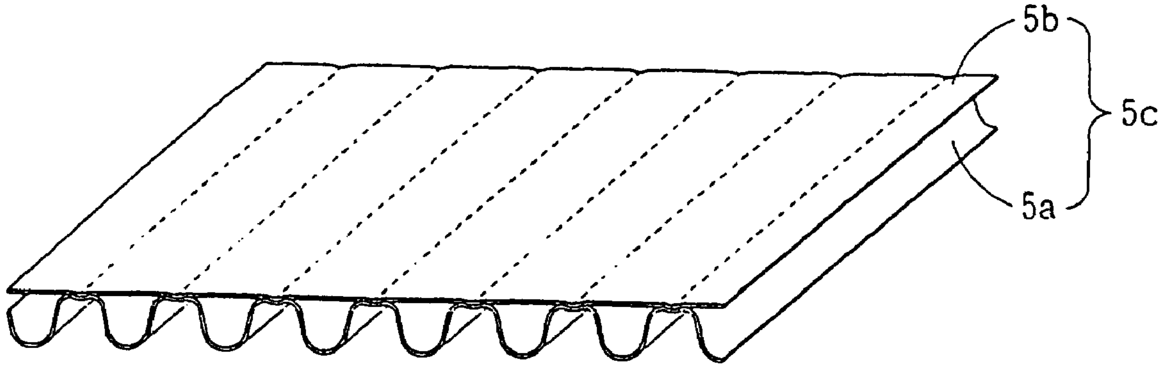
FIG. 2 PRIOR ART
FIG. 2 is a perspective view of a piece of corrugated paper made with the conventional device, illustrating surface defects of the paper.
Figure 3A:
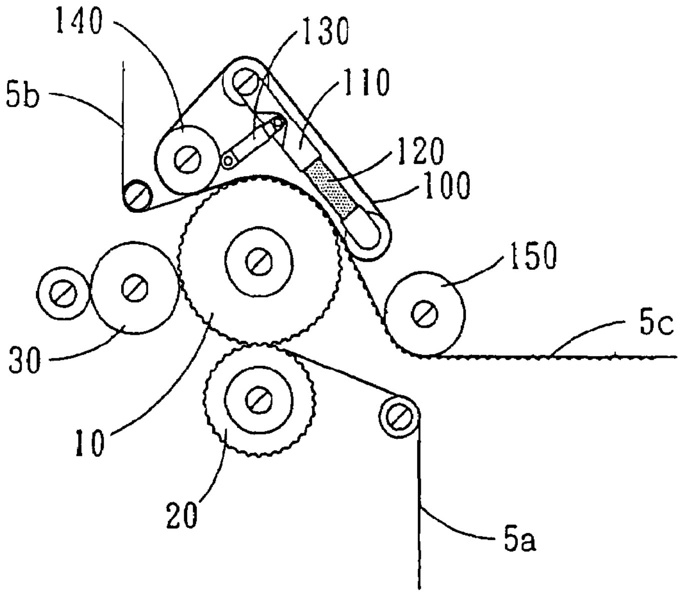
FIG. 3A is a schematic view showing a bonding mechanism of a corrugated paper making machine constructed in accordance with the present invention.

With reference to the drawings and in particular to FIG. 3A, a corrugated paper bonding mechanism constructed in accordance with the present invention is provided for operating with a corrugated paper making machine for bonding a surface sheet of a piece of a corrugated paper to a core sheet to form the corrugated paper. The bonding mechanism comprises a flexible band 100 and an adjusting mechanism that adjustably positions the band 100 against the surface sheet 5*b* of the corrugated paper to establish therebetween a surface contact, thereby inducing a pressurizing area between the surface sheet 5*b* and a core sheet 5*a*. The pressurizing area is adjustable in size due to the adjustability of the surface contact of the flexible band 100 with the surface sheet 5*b* by the adjusting mechanism. This will be further described later.

The bonding mechanism of the present invention comprises a primary corrugated roller 10 and a secondary corrugated roller 20 between which the core sheet 5*a* is fed to form corrugation thereon. A paste application roller 30 applies a layer of paste on a surface of the core sheet 5*a* over which the surface sheet 5*b* is laid. The band 100 are brought into surface contact with the surface sheet 5*b* that overlaps the core sheet 5*a* and a pressurizing area is formed between the surface sheet 5*b* and the core sheet 5*a* to induce a pressure over the pressurizing area between the surface sheet 5*b* and the core sheet 5*a* to have the surface sheet 5*b* securely bonded to the core sheet 5*a* and thus forming the piece of corrugated paper 5*c*, as shown in FIG. 5*c*.

The adjusting mechanism selectively moves the band 100 toward/away from the primary corrugated roller 10 to change the contact surface between the band 100 and the surface sheet 5*b* and thus changing the pressurizing area between the surface sheet 5*b* and the core sheet 5*a*. The adjusting mechanism can be of any suitable configuration/construction providing adjustability of the contact surface/pressurizing area can be effected.

Figure 3B:
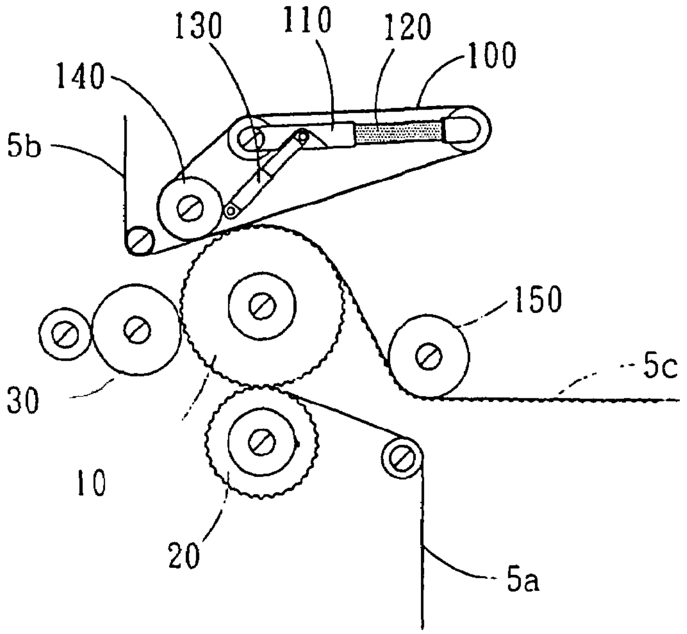
FIG. 3B is similar to FIG. 3A, but showing the adjustment of the bonding mechanism.
Figure 3C:
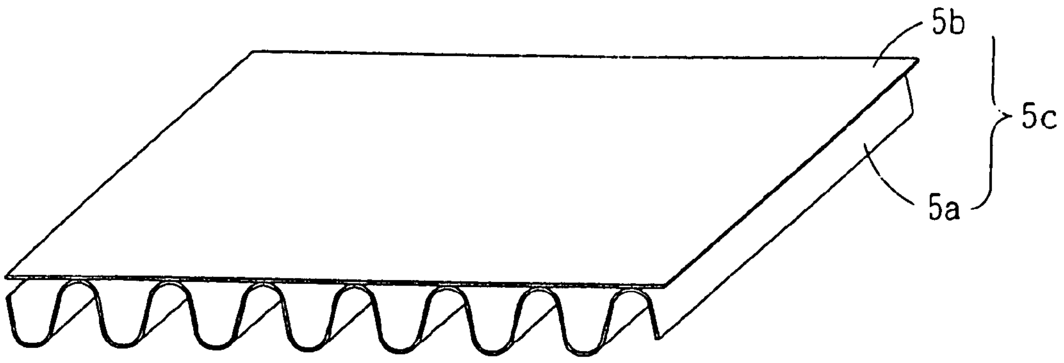
FIG. 3C is a perspective view of a piece of corrugated paper made with the bonding mechanism of the present invention.
Figure 4A:
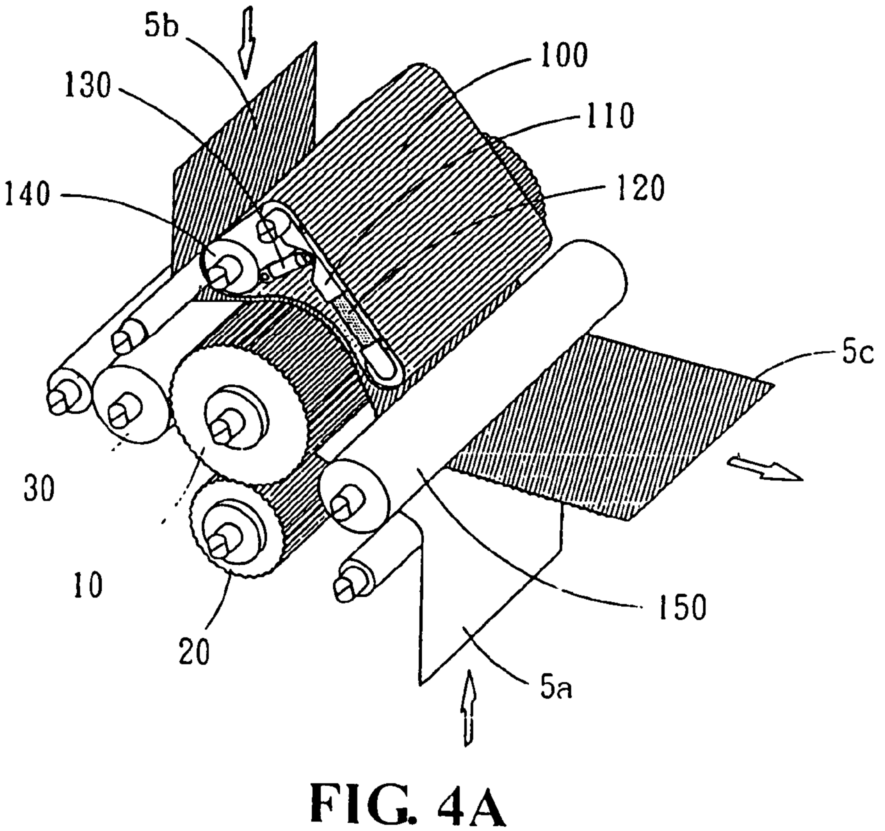
FIGS. 4A and 4B are perspective views, taken from different perspectives, of the bonding mechanism of the present invention.
Figure 4B:
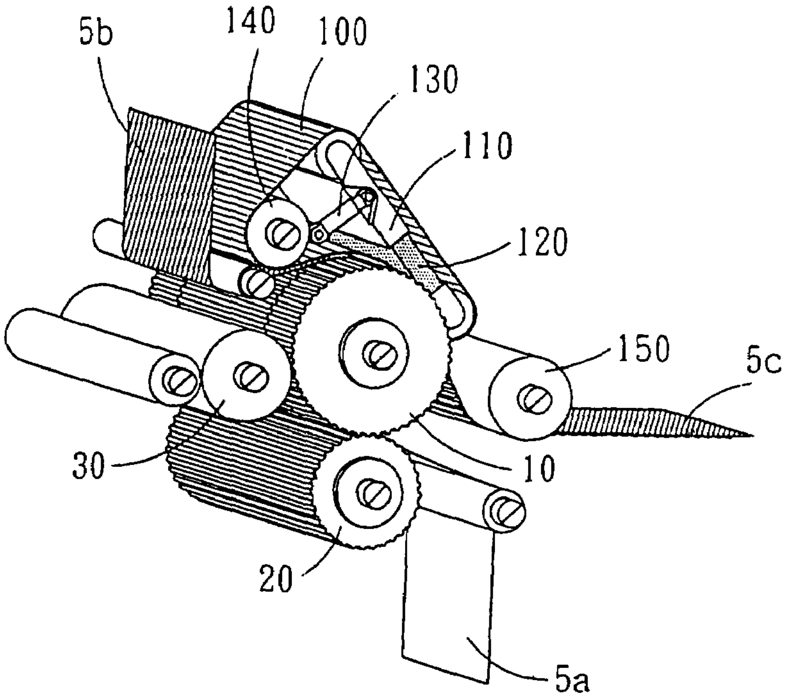

An example of the adjusting mechanism, as showing in FIGS. 3A and 3B, as well as FIGS. 4A and 4B, comprises a plurality of rollers 140 around which the band 100 that is in the form of an endless loop extends. In the embodiment illustrated, three rollers are used to support the continuous operation of the band 100. Among the three rollers, one servers as a tension roller that maintain proper tension on the endless loop like band 100, while the other two serve as pressurizing rollers that maintain a portion of the band 100 on the surface sheet 5*b* to induce a pressure thereon. In the embodiment illustrated in FIG. 3A, one of the pressurizing rollers is fixed in position, while the other pressurizing roller and the tension roller rollers are supported by a swing arm 110 and thus are movable with respect to the primary corrugated roller 10 by the movement of the swing arm 110. The swing arm 110 comprises an extendible device 120 that, when operated, changes the distance between the two rollers supported by the swing arm 110. The swing arm 110 is supported by an elevating device 130 that is comprised of an extendible member whereby the extension/contraction of the elevating device 130 moves or swings the swing arm 110 to change the position of the swing arm 110 (and thus the rollers supported on the swing arm 110) with respect to the primary corrugated roller 10. By operating the elevating device 130 to selectively position the swing arm 110 with respect to the primary corrugated roller 10, the band 100 is put to surface contact the surface sheet within an angular range determined by the position of the swing arm 110 with respect to the primary corrugated roller 10. This can be easily understood by comparing FIG. 3A with FIG. 3B. Thus, the pressurizing area between the surface sheet 5*b* and the core sheet 5*a* can be adjusted to provide proper pressurization between the sheets 5*b*, 5*a* for making high quality corrugated paper 5*c* with no surface damage or fracture as shown in FIG. 5*c*.

Figure 5A:
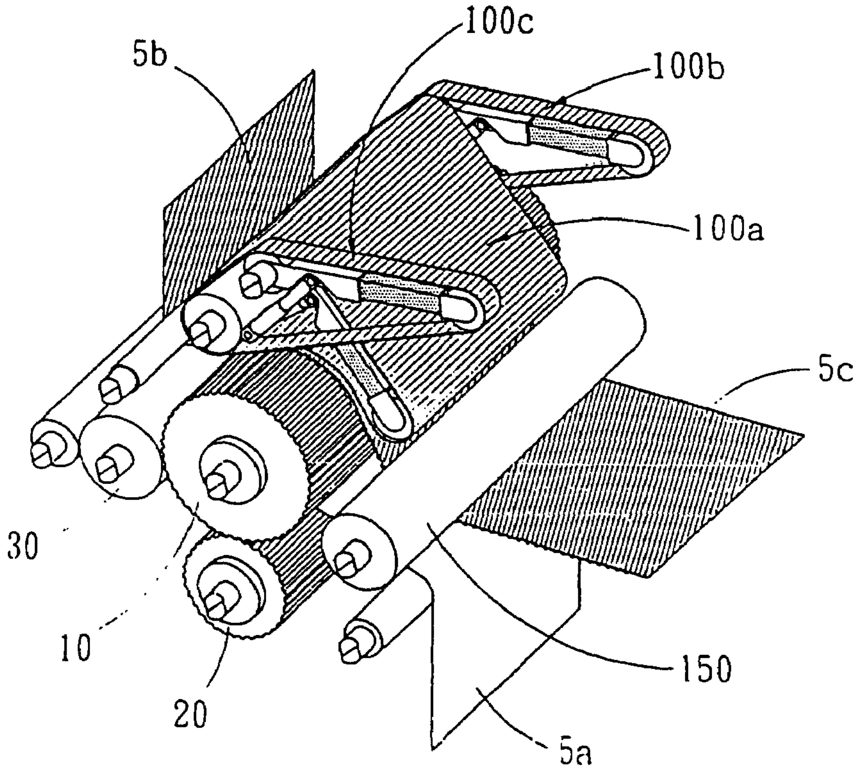
FIG. 5A is a perspective view showing a bonding mechanism in accordance with another embodiment of the present invention.

FIG. 5A shows another embodiment of the present invention, wherein the band 100 of the embodiment shown in FIG. 3A, 3B, 4A and 4B is divided along the width thereof into a central band 100*a* and two side bands 100*b*, 100*c*, all in the form of endless loop, which are supported by their own adjusting mechanisms, whereby corrugated paper of different width or span can be manufactured by selectively employing the central band 100*a* and the side bands 100*b*, 100*c*.

If desired, a heating roller 150 can be arranged downstream the bands 100*a*, 100*b*, 100*c* to accelerate curing of the paste between the core sheet 5*a* and the surface sheet 5*b*.

Figure 5B:
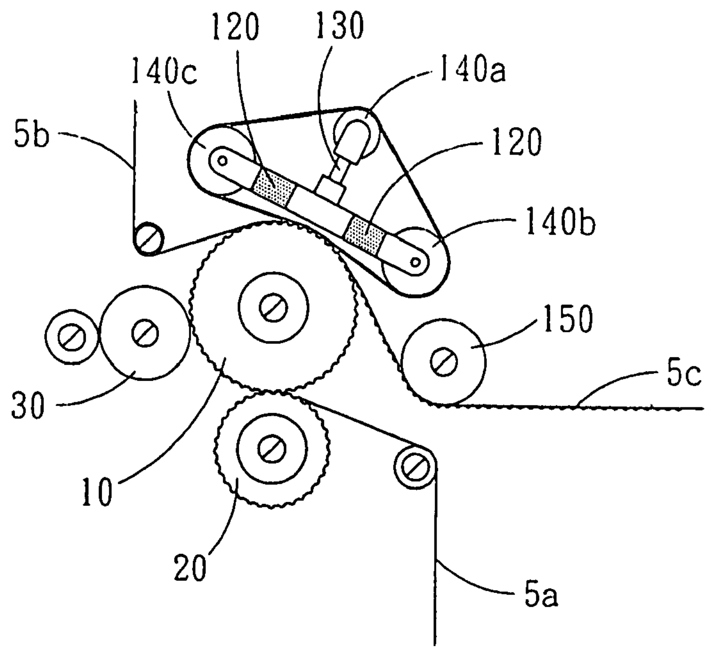
FIG. 5B is a schematic view showing a bonding mechanism in accordance with a further embodiment of the present invention.
Figure 5C:
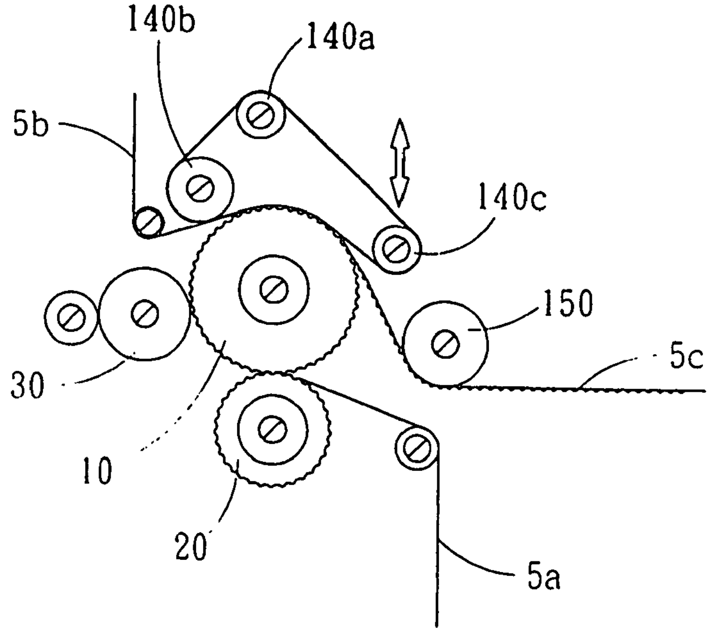
FIG. 5C is a schematic view showing a bonding mechanism in accordance with yet a further embodiment of the present invention.

FIG. 5B shows a further embodiment of the present invention, wherein both pressurizing rollers 140*b*, 140*c* are supported on a movable member comprised of two extendible members 120 each supporting one pressurizing roller 140*b*, 140*c*. The movable member is supported by an elevating member 13 that also supports the tension roller 140*a*. The extendible members 120 can extend/contract to control the tension of the band 100. FIG. 5C shows yet a further embodiment of the present invention, wherein three rollers 140*a*, 140*b*, 140*c* are used to support rotation of the band 100. One roller 140*c* is movable to change the angular range that the band 100 is positioned over the surface sheet 5*b*.

The embodiments of the adjusting mechanism discussed above are selectively comprised of a swing arm 110, extendible members 120, elevating member 130, and rollers 140. All these mechanical parts are known and can be operated with any known manner. For example, the elevating member 130 can be driven by a hydraulic device, a cam assembly, or screw rod. All these variations are considered within the scope of the present invention.

Although the present invention has been described with reference to the preferred embodiments thereof, it is apparent to those skilled in the art that a variety of modifications and changes may be made without departing from the scope of the present invention which is intended to be defined by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spit of the present invention.

I claim:

1. A corrugated paper bonding device comprising:

a primary corrugated roller;

a surface corrugated roller mounted under said primary corrugated roller;

a core sheet fed through between said primary corrugated roller and said surface corrugated roller;

a paste application roller applying a layer of paste on a surface of said core sheet;

an adjusting mechanism including a first, a second and a third rollers and an endless band mounted around said rollers, said first roller serving as a tension roller, and said second and third rollers serving as pressurizing rollers, said first roller and said third roller being supported by a swing arm, said swing arm having an extendible member for changing distance between second and third rollers to adjust tension, said swing arm being supported by an elevating device so that said elevating device can move said swing arm to change position of said swing arm with respect to said primary corrugated roller, a surface sheet located above said paste application and fed through between said adjusting mechanism and said primary corrugated roller;

wherein said band is put to surface contact with said surface sheet within an angular range determined by position of said swing arm with respect to said primary corrugated roller by operating said elevating device to selectively position said swing arm with respect to said primary corrugated roller, thereby pressurizing area between said surface sheet and said core sheet can be adjusted to provide pressurization between said surface sheet and said core sheet with no surface damage or fracture to said surface sheet.

2. The corrugated paper bonding device as claimed in claim 1, further comprising a heating roller to accelerate curing of a paste applied between said surface sheet and said core sheet.

* * * * *